(12) United States Patent
Bae et al.

(10) Patent No.: US 12,246,829 B2
(45) Date of Patent: Mar. 11, 2025

(54) TRANSFORMABLE WING AND AERIAL VEHICLE INCLUDING SAME

(71) Applicant: INDUSTRY-UNIVERSITY COOPERATION FOUNDATION KOREA AEROSPACE UNIVERSITY, Goyang-si (KR)

(72) Inventors: Jaesung Bae, Seoul (KR); Hyunchul Lee, Seoul (KR); Jaebaek Jeong, Seongnam-si (KR); Seokmin Moon, Goyang-si (KR)

(73) Assignee: INDUSTRY-UNIVERSITY COOPERATION FOUNDATION KOREA AEROSPACE UNIVERSITY, Goyang-si (KR)

(*) Notice: Subject to any disclaimer, the term of this patent is extended or adjusted under 35 U.S.C. 154(b) by 0 days.

(21) Appl. No.: 18/322,412

(22) Filed: May 23, 2023

(65) Prior Publication Data

US 2023/0294815 A1 Sep. 21, 2023

Related U.S. Application Data

(63) Continuation of application No. PCT/KR2021/017172, filed on Nov. 22, 2021.

(30) Foreign Application Priority Data

Nov. 25, 2020 (KR) .................. 10-2020-0159631
Nov. 19, 2021 (KR) .................. 10-2021-0160381

(51) Int. Cl.
*B64C 3/54* (2006.01)
*B64C 3/18* (2006.01)
*B64C 3/44* (2006.01)

(52) U.S. Cl.
CPC ............ *B64C 3/54* (2013.01); *B64C 3/185* (2013.01); *B64C 3/187* (2013.01); *B64C 3/44* (2013.01)

(58) Field of Classification Search
CPC ................ B64C 3/54; B64C 3/44; B64C 3/48
See application file for complete search history.

(56) References Cited

U.S. PATENT DOCUMENTS 7,762,500 B1 * 7/2010 Dhall ...................... B64C 3/56
 244/45 R
8,864,065 B2 * 10/2014 Koehler .................. B64C 3/56
 244/49

(Continued)

FOREIGN PATENT DOCUMENTS

KR 10-1271485 B1 6/2013
KR 10-1333252 B1 11/2013

(Continued)

OTHER PUBLICATIONS

Hyeoncheol Lee, "Design and application of variable-camnber and variable-chord morphing flap mechanism", Master's thesis, Korea Aerospace University, Feb. 2020.

*Primary Examiner* — Philip J Bonzell
*Assistant Examiner* — Eric Acosta
(74) *Attorney, Agent, or Firm* — Bridgeway IP Law Group, PLLC; Jihun Kim

(57) ABSTRACT

Disclosed is a transformable wing, which comprises: a main wing including multiple ribs extending in the forward and backward direction of the wing wherein the multiple ribs are arranged at intervals in a lengthwise direction of the wing; and a span morphing part including an auxiliary wing extending in the lengthwise direction, a scissors part connected to one end of the auxiliary wing in the lengthwise (Continued)

direction, and a driving part for extending or reducing the scissor part in the lengthwise direction.

12 Claims, 9 Drawing Sheets

(56) References Cited

U.S. PATENT DOCUMENTS

| | | | |
|---|---|---|---|
| 2010/0294893 A1* | 11/2010 | Heintze | B64C 3/48 |
| | | | 244/219 |
| 2011/0042524 A1* | 2/2011 | Hemmelgarn | B64C 3/48 |
| | | | 244/203 |
| 2018/0057136 A1* | 3/2018 | Haley | A63H 27/001 |

FOREIGN PATENT DOCUMENTS

| | | |
|---|---|---|
| KR | 10-2014-0125721 A | 10/2014 |
| KR | 10-2015-0106989 A | 9/2015 |
| KR | 10-2016-0002478 A | 1/2016 |
| KR | 10-1902698 B1 | 9/2018 |
| WO | 2020-059896 A1 | 3/2020 |

* cited by examiner

Cross-Section A-A

Cross-Section B-B

TRANSFORMABLE WING AND AERIAL VEHICLE INCLUDING SAME

TECHNICAL FIELD

The present invention relates to a transformable wing and an aerial vehicle including the same.

This research was supported by a research grant from the "Development of Biomimetic Structure Technology for Unmanned Vehicles" project of the Aerospace Components Technology Development Project Unmanned Vehicle Source Technology Development (R&D) Research Program (Project Assignment No.: 1711119935, Project No.: 2020M3C1C1A01083415, Department name: the Ministry of Science and ICT of Korea, Project management organization: National Research Foundation of Korea, Project execution organization: Korea Advanced Institute of Science and Technology, Research period: Jun. 1, 2020 to May 31, 2027, Contribution rate: 1/2). Further, this research was supported by the research grant from the "Development of Zero Carbon Future Air Vehicle Technology (Research Institute of Aerospace Engineering and Technology)" project of the Key Research Institute Support (Science and Engineering Field) Research Program (Project Assignment No.: 1345354139, Project No.: 2022R1A6A1A03056784, Department name: Ministry of Education, Project management organization: National Research Foundation of Korea, Project executing organization: Korea Aerospace University, Research period: Mar. 1, 2023 to Feb. 29, 2024, Contribution rate: 1/2).

BACKGROUND ART

In engineering, the most important value is efficiency, which can be also applied to aerospace engineering. In aircrafts, aerodynamic efficiency is directly related to fuel consumption and is also associated with economic profit and loss. Modern aircrafts have long been studied and developed to increase efficiency, such as streamlined fuselages and winglets.

However, a control surface of an aircraft is still designed in such a way that a portion of the wing is bent. In this case, a hinge portion of the wing will experience drag due to flow separation or vortices, which may lead to a decrease in efficiency.

Therefore, researchers are actively developing technologies to transform the wing so that the wing has the optimal shape for the flight conditions of the aircraft.

In this regard, Korean Patent Publication No. 10-1333252 has been previously published.

DISCLOSURE

Technical Problem

The present invention has been made in an effort to solve the above-mentioned problems in the related art, and an object of the present invention is to provide a transformable wing and an aerial vehicle including the same that is capable of transforming one or more chord lengths and cambers of an airfoil and transforming a wingspan by rotational force alone while maintaining a continuous surface.

However, technical problems to be solved by the exemplary embodiment of the present application are not limited to the aforementioned technical problem, and other technical problems may be present.

Technical Solution

According to an aspect of the present invention, there is provided a transformable wing having one end thereof connected to a fuselage in a lengthwise direction, the transformable wing including: a main wing comprising: a plurality of ribs extending in forward and backward directions of the wing, wherein the plurality of ribs are disposed at intervals in the lengthwise direction of the wing; and a span morphing part comprising: an auxiliary wing extending in the lengthwise direction; a scissors part connected to one end of the auxiliary wing in the lengthwise direction; a driving part extending or reduction the scissors part in the lengthwise direction; wherein the span morphing part is disposed for the auxiliary wing and the scissors part to movably pass through some of the ribs positioned at the other side of the main wing in the lengthwise direction among the plurality of ribs, wherein some other of the ribs positioned at one side in the lengthwise direction of the some of the ribs among the plurality of ribs is a morphing rib configured to operate to transform at least one of a length of a chord and a camber of an airfoil of a portion that the some other of the ribs of the wing, and wherein the main wing further comprises a driving part configured to operate the morphing rib.

According to an aspect of the present invention, there is provided an aerial vehicle comprising: a wing according to an aspect of the present invention; and a fuselage to which the wing is coupled.

The technical solution is just illustrative but should not be interpreted as being intended to limit the present application. In addition to the above-mentioned exemplary embodiment, additional exemplary embodiments may be present in the drawings and the detailed description of the present invention.

Advantageous Effects

According to the technical solutions according to the present application, it is possible for the auxiliary wing to protrude from the main wing to the other side by the span morphing part, to be adjustable in the length of the wing in the form that the auxiliary wing is accommodated in the main wing, and to transform one or more of the chord lengths and cambers of the airfoil by the driving part that drives the morphing rib. Therefore, one or more of the chord lengths and the cambers of the airfoil may be transformable, and the wing that is capable of transforming the length of the wing and the aerial vehicle including the same may be implemented.

MODE FOR INVENTION

Figure 1:
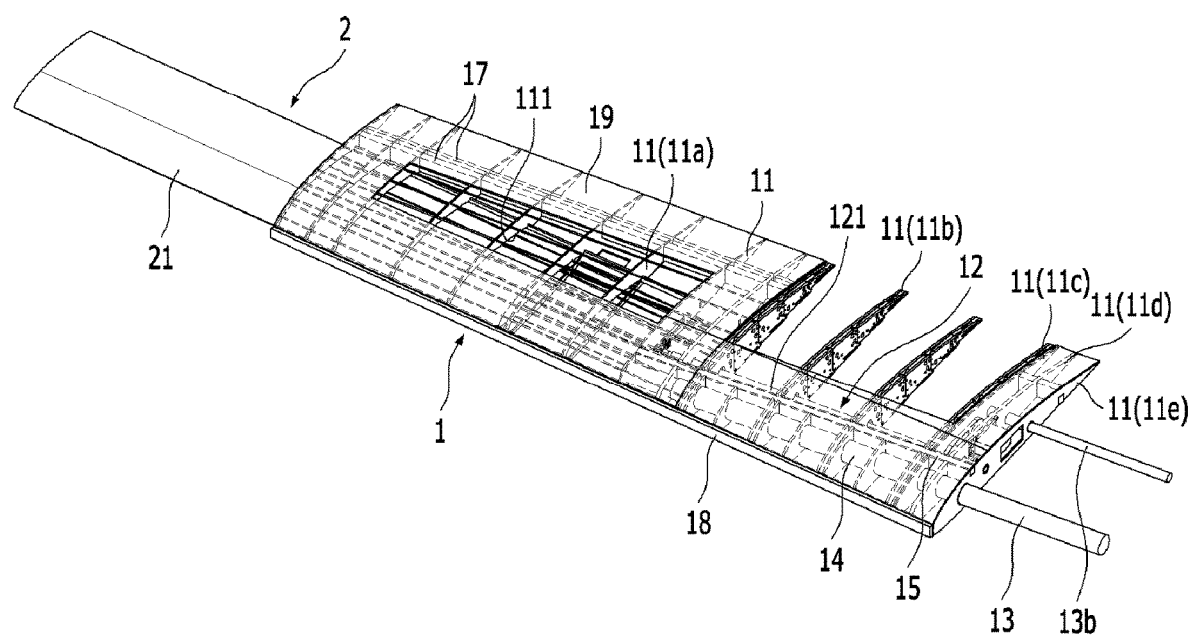
FIG. 1 is a schematic conceptual perspective view illustrating a part of the inner portion of a wing according to an embodiment of the present invention.

Hereinafter, embodiments of the present application will be described in detail with reference to the accompanying drawings so that those with ordinary skill in the art to which the present application pertains may easily carry out the embodiments. However, the present application may be implemented in various different ways, and is not limited to the embodiments described herein. A part irrelevant to the description will be omitted in the drawings in order to clearly describe the present application, and similar constituent elements will be designated by similar reference numerals throughout the specification.

Throughout the specification of the present application, when one constituent element is referred to as being "connected to" another constituent element, one constituent element can be "directly connected to" the other constituent element, and one constituent element can also be "electrically connected to" the other element with other elements therebetween.

Throughout the specification of the present application, when one member is disposed "on", "at an upper side of", "at an upper end of", "below", "at a lower side of", or "at a lower end of" another member in the present specification of the present application, this includes not only a case where one member is brought into contact with another member, but also a case where still another member is present between the two members.

Throughout the specification of the present application, unless explicitly described to the contrary, the word "comprise" or "include" and variations, such as "comprises", "comprising", "includes" or "including", will be understood to imply the inclusion of stated constituent elements, not the exclusion of any other constituent elements.

For reference, the terms (a front side, a rear side, an upper side, a lower side, etc.) relevant to the direction or the position in the exemplary embodiment of the present application are set based on the arranged states of the respective components illustrated in the drawings. For example, with reference to FIG. 1, the 8 o'clock direction generally represents the front side, the 2 o'clock direction generally represents the rear side, the 12 o'clock direction generally represents the top side, the 6 o'clock direction generally represents the bottom side, and so on.

The present invention relates to a transformable wing and an aerial vehicle including the same.

First, a transformable wing (hereinafter referred to as "a wing according to the present invention") according to an embodiment of the present invention will be described. For reference, the wing according to the present invention may also be referred to as a morphing wing with a variable camber, variable chord, and variable span being applied.

Figure 2:
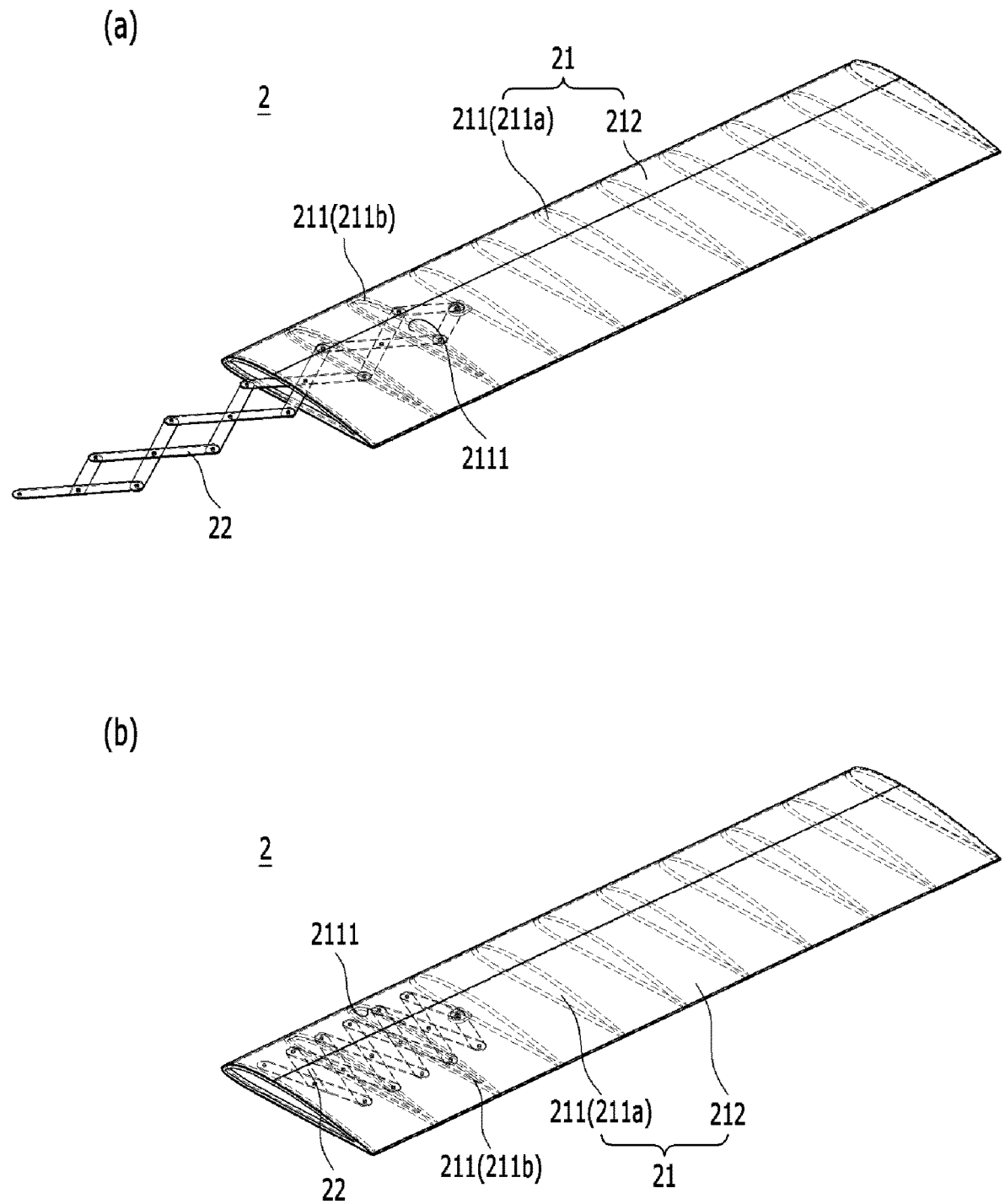
FIG. 2 is a schematic conceptual perspective view illustrating a span morphing part of the wing according to an embodiment of the present invention.
Figure 3:
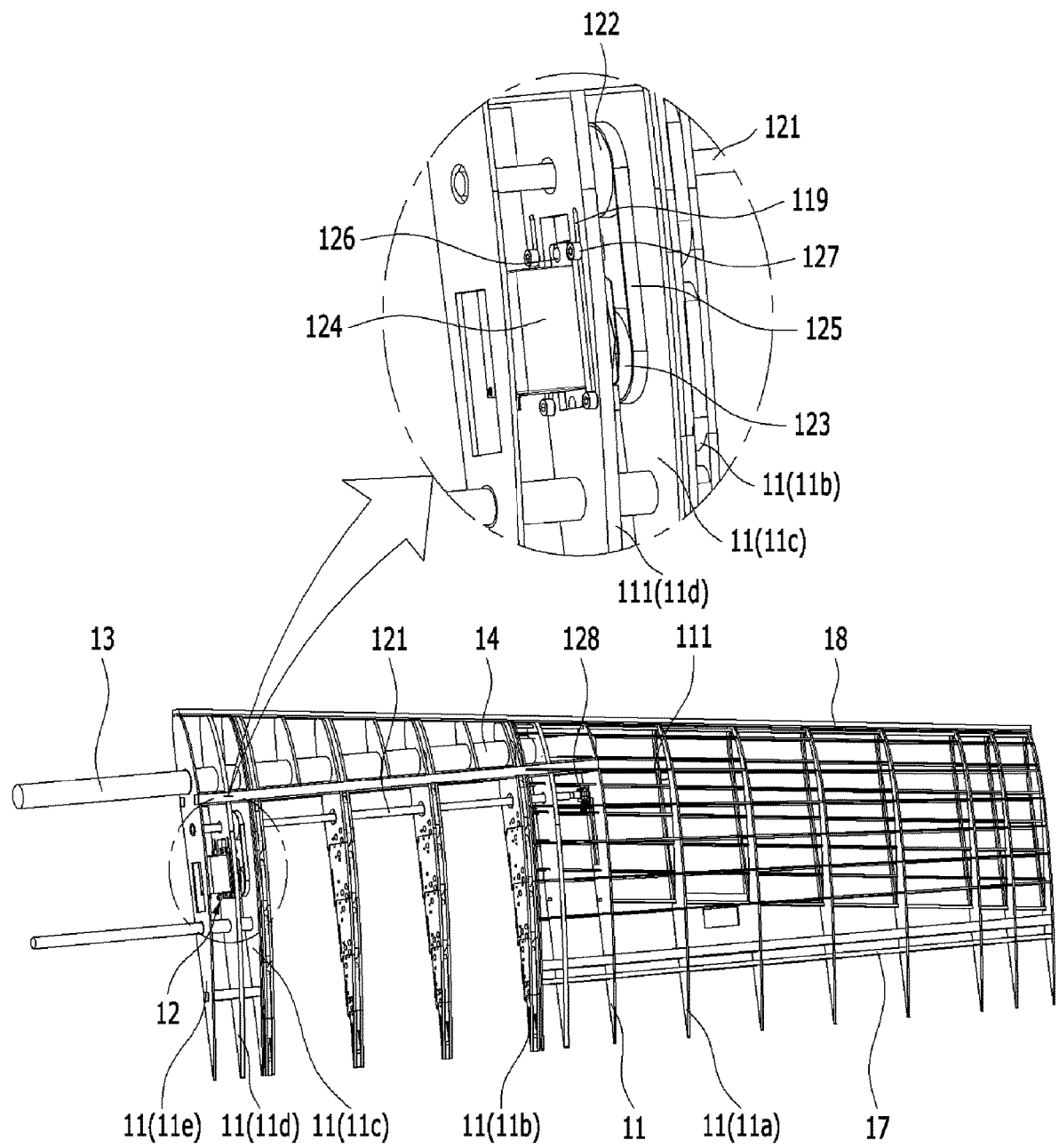
FIG. 3 is a schematic conceptual perspective view of a main wing of a wing according to one embodiment of the present invention, with some configurations omitted.
Figure 4:
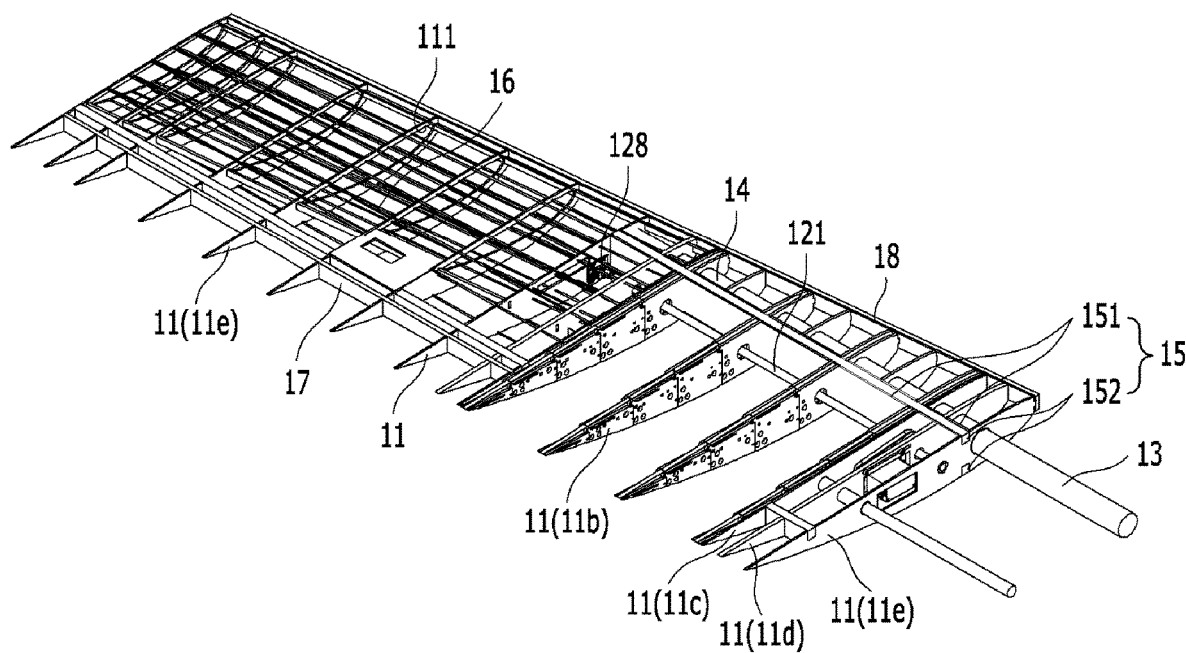
FIG. 4 is a schematic conceptual perspective view illustrating the main wing of the wing according to an embodiment of the present invention, with some configurations omitted, viewed from a different angle than in FIG. 3.
Figure 5:
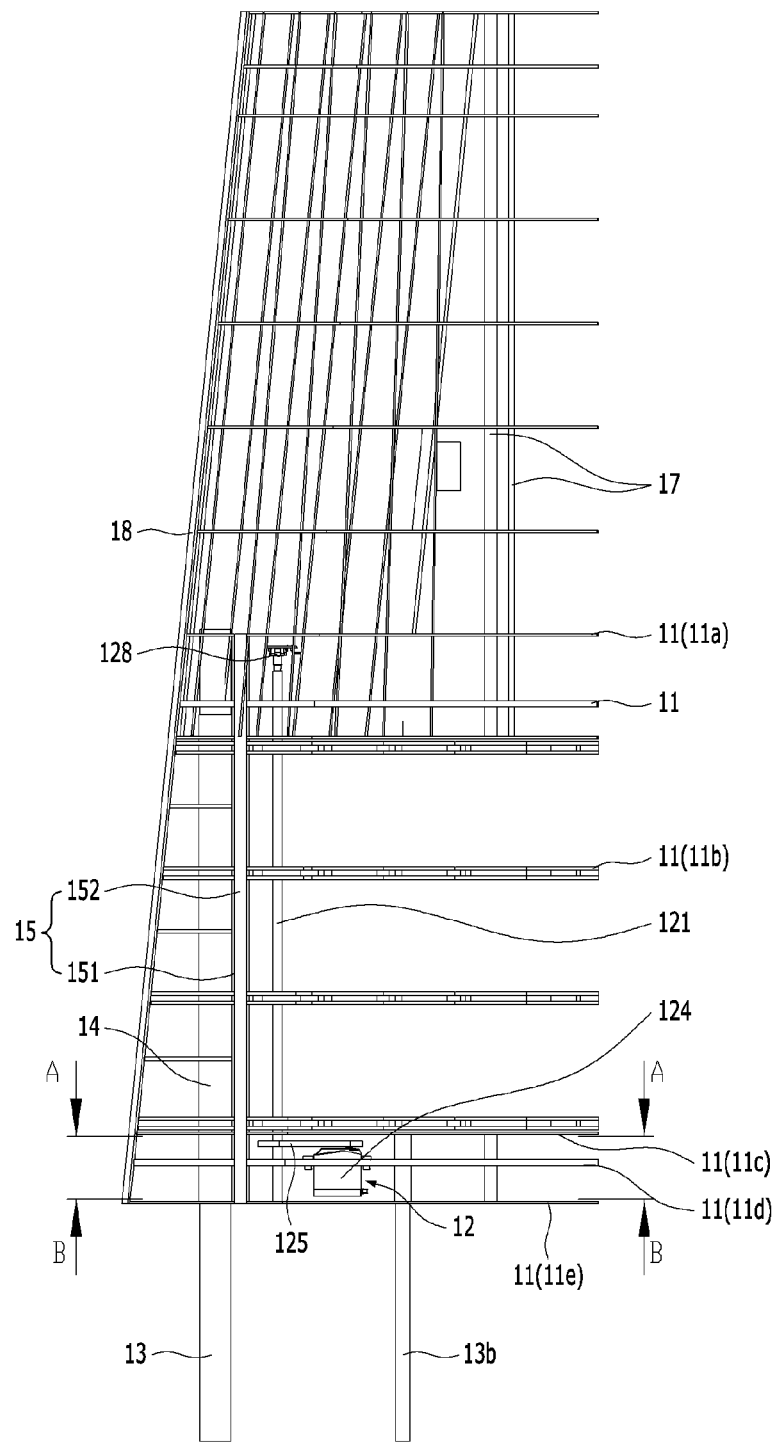
FIG. 5 is a schematic plan view illustrating the main wing of the wing according to an embodiment of the present invention, with some configurations omitted.

FIG. 1 is a schematic conceptual perspective view illustrating a part of the inner portion of a wing according to an embodiment of the present invention, FIG. 2 is a schematic conceptual perspective view illustrating a span morphing part of the wing according to an embodiment of the present invention, FIG. 3 is a schematic conceptual perspective view of a main wing of a wing according to one embodiment of the present invention, with some configurations omitted, FIG. 4 is a schematic conceptual perspective view illustrating the main wing of the wing according to an embodiment of the present invention, with some configurations omitted, viewed from a different angle than in FIG. 3, FIG. 5 is a schematic plan view illustrating the main wing of the wing according to an embodiment of the present invention, with some configurations omitted, FIG. 6A is a view illustrating the cross-section taken along line A-A in FIG. 5, FIG. 6B is a view illustrating the cross-section taken along line the B-B in FIG. 5.

One end of the wing according to present invention is connected to a fuselage in the lengthwise direction of the wing.

The wing according to the present invention may be applied in various fields, and may be applied as a wing of an aerial vehicle (an aircraft), a blade of a wind turbine, and the like. Accordingly, the term fuselage may refer to a body of an aerial vehicle, a body of a wind turbine, etc.

With reference to FIG. 1, the wing according to the present invention includes a main wing 1. The main wing 1 includes a plurality of ribs 11 extending in the forward and backward directions of the wing. The plurality of ribs 11 are disposed at intervals in the lengthwise direction of the wing. The ribs 11 form the framework of the main wing 1 and may be a wing structural member in a chord direction of, which create the cross-sectional shape of an airfoil of the main wing 1. This is obvious to those of ordinary skill in the art, and will not be described in details.

In addition, with reference to FIGS. 1 and 2, the wing according to the present invention includes a span morphing part 2. The span morphing part 2 includes an auxiliary wing 21 extending in the lengthwise direction. Referring to FIG. 2, for example, the auxiliary wing 21 may include a plurality of auxiliary wing ribs 211. The plurality of auxiliary wing ribs 211 may each extend in the forward and backward directions of the wing. Further, the plurality of auxiliary wing ribs 211 may be disposed at intervals in the lengthwise direction. The auxiliary wing ribs 211 form the framework of the auxiliary wing 21 and may be a wing structural member in the chord direction, which creates a cross-sectional shape of an airfoil of the auxiliary wing 21. The auxiliary wing 21 may include an auxiliary wing skin 212 that encloses the plurality of auxiliary wing ribs 211. The auxiliary wing skin 212 may be made of an elastic material. The auxiliary wing ribs 211 and the wing skin 212 are obvious to those of ordinary skill in the art and will not be described in detail.

Also referring to FIG. 2, the span morphing part 2 may include a scissors part 22 connected to one end of the auxiliary wing 21 in the lengthwise direction and a driving part (not illustrated) that extends or reduces the scissors part 22 in the lengthwise direction. The driving part may be, for example, a linear actuator. One end of the scissors part 22 may be connected to an end of the actuator, and the scissors part 22 may be extended or reduced in the lengthwise direction according to the extension or reduction of the actuator in the lengthwise direction.

In addition, with reference to FIG. 1, the auxiliary wing 21 and the scissors part 11a of the span morphing part 2 are movably disposed to pass through some of the ribs 11a positioned at the other side in the lengthwise direction among the plurality of ribs 11 Specifically, with reference to FIGS. 1 and 3 together, some 11a of the ribs are provided to have pass-through holes 111 formed therein in a longitudinal sectional view to be sized to allow the auxiliary wing 21 and the scissors part 22 to pass through. Accordingly, the scissors part 22 and the auxiliary wing 21 may move through the pass-through holes 111 when the scissors part 22 is extended or reduced in the lengthwise direction. In addition, in the accommodated state in which the auxiliary wing 21 is accommodated in the main wing 1, at least a portion of the auxiliary wing 21 or at least a portion of the scissors part 22 may be accommodated within a space formed by the pass-through holes 111.

That is, while one end of the scissors part 22 is connected to the driving part provided on the main wing 1, the other end of the scissors part 22 moves to one side. Thereby, the scissors part 22 may be extended (elongated). In this case, when the scissors part 22 is elongated, the auxiliary wing 21 passes through the pass-through holes and protrudes to one side of the main wing 1, thereby extending the length of the wing according to the present invention. When the other end of the scissors part 22 moves to the other side, the scissors part 22 may be reduced. As the scissors part 22 is reduced, the auxiliary wing 22 moves inwardly of the main wing 1, thereby reducing the length of the wing according to the present invention. Accordingly, a minimum length of the wing according to the present invention may be formed in the accommodated state in which the auxiliary wing 21 is accommodated in the main wing 1. The scissors part 22, the driving part, the auxiliary wing, and the like may be utilized and understood in detail by the present applicant's application patent, U.S. Patent Publication No. 10-2015-0106989, or the improvements thereof. Therefore, a detailed description will be omitted.

In addition, with reference to FIG. 2A, some of ribs 211a among the plurality of ribs of the auxiliary wing positioned at one side in the longitudinal direction may be provided as closed ribs having a closed cross-section cut in the forward and backward directions. Accordingly, at least a portion of the auxiliary wing 21 extends longitudinally from the main wing 1 to the other side, and in the extended state where the auxiliary wing 21 is exposed to the other side of the main wing 1 in the longitudinal direction. Thereby, ensuring rigidity of the auxiliary wing 21 exposed to the outside of the main wing 1 may be achieved. The auxiliary wing 21 is exposed to the other side of the main wing 1 in the lengthwise direction, and therefore higher rigidity may be required. Accordingly, among the ribs 211 of the auxiliary wing 21, some of ribs 211a preferably have a closed cross-section to ensure rigidity.

In addition, with reference to FIG. 2A, another portion of the auxiliary wing rib 211b positioned at the longitudinal other side among the plurality of auxiliary wing ribs 211 may be provided as an open rib in which a pass-through hole 2111 is formed having a size of a longitudinal cross-section through which the scissors part 22 is passable.

In addition, with reference to FIG. 2B, in the accommodated state in which the auxiliary wing 21 is accommodated in the main wing 1, at least a portion of the scissors part 22 may be disposed to be accommodated within the space formed by the through holes 2111. Accordingly, upon elongation of the scissors part 22, a portion of the scissors part 22 may move out of the through hole 2111 formed in the open rib 211b of the scissors part 21 and the auxiliary wing 21 may move to one side relative to the main wing 1. Upon reduction of the scissors part 22, at least a portion of the scissors part 22 is accommodated in the through holes 2111 and the auxiliary wing 21 moves to the other side and may be accommodated in the main wing 1.

Accordingly, in the accommodated state, length extensibility of the wing according to the present invention may be increased compared to the case where the scissors part 22 is not accommodated within the auxiliary wing 21, that is, where the scissors part 22 extends and reduces on the other side of the auxiliary wing 21. Specifically, when the scissors part 22 is not accommodated within the auxiliary wing 21 in the accommodated state, the accommodation space of the main wing 1 (which may be the space formed by the pass-through hole 111 of a portion of the rib 11a of the main wing 1) need to be accommodated with the auxiliary wing 21 as well as the scissors part 22 positioned side by side in the lengthwise direction, so that the wing of the auxiliary wing 21 is provided with a short span. By contrast, according to the present invention, since at least a portion of the scissors part 22 is accommodated within the auxiliary wing 21 in the accommodated state, the auxiliary wing 21 may be provided with an increased length corresponding to the accommodated amount of the scissors part 22 in the auxiliary wing 21. Accordingly, the amount of length extension of the wing according to the present invention may be increased.

Furthermore, the closed rib 211a on the longitudinal other side having a closed cross-section may be provided in consideration of securing rigidity of the auxiliary wing 21 that is exposed outside the main wing 1 in the state that the auxiliary wing is extended. As described above, since the auxiliary wing 21 may be exposed to one side of the main wing 1, securing rigidity may be important, and the number of closed ribs 211a among the auxiliary wing ribs 211, the interval between the closed ribs 211a, the thickness of the closed rib 211a, and the like may be configured in consideration of securing rigidity of the auxiliary wing 21.

Furthermore, the open rib 211b on one side of the longitudinal direction in which the pass-through hole 2111 is formed may be provided in consideration of the accommodation space of the scissors part 22. As described above, since the scissors part 22 may be accommodated within the accommodation space formed by the pass-through hole 2111 of the open rib 211b, the number of open ribs 211b, the interval between the open ribs 211b, the thickness of the open rib 211b, and the like may be configured in consideration of the accommodation, the securing of the rigidity of the auxiliary wing 21, and the like.

In addition, with reference to FIGS. 1 and 3, some of the ribs 11b positioned at one side in the lengthwise direction of some of the ribs 11a, among the plurality ribs 11 of the main wing 1, are morphing rib 11b that operate to transform at least one of a chord length and a camber of the airfoil at the portion formed by some other of the ribs 11b of the main wing. Further, with reference to FIG. 3, the main wing 1 may include a driving part 12 that drives the morphing rib 11b. When the morphing rib 11b is operated by the driving part 12, at least one of the chord length and camber of the airfoil of the portion formed by the morphing rib 11b of the wing may be transformed. The morphing rib 11b may form a morphing flap. The driving part 12 may operate the morphing flap by operating (driving) the morphing rib 11b. For example, the morphing flap (morphing rib 11b) is developed by the pulling of a wire, and the wire may be pulled by means of the winding of a shaft 121 described below of the driving part 12. The driving part 12, the morphing rib 11b, the morphing flap, and the like may be utilized and understood in detail by the present applicant's application patent, U.S. Patent Publication No. 10-1902698, or the improvements thereof. Therefore, a detailed description will be omitted.

With reference to FIGS. 1, 3, and 4, the driving part 12 passes through the leading edge of the morphing rib 11b and may include a shaft 121 rotatably disposed relative to the morphing rib 11b to operate the morphing rib 11b. Further, the shaft 121 passes through the leading edge of the auxiliary rib 11c positioned at one side in the lengthwise direction of the morphing rib 11b, and may be rotatably disposed relative to the auxiliary rib 11c.

In addition, with reference to FIG. 1, the main wing 1 may have an overall tapered shape to have a sweepback angle when the auxiliary wing 21 is operated, and the morphing flap (the portion formed by the morphing rib 11b of the main wing 1) may have a square shape for smooth operation. Accordingly, since an area of the front portion of the main wing 1 may become smaller, additional structures may be required. In this case, the wing according to the present invention may be provided with the morphing rib 11b and the shaft 121 such that the shaft 121 used to operate the morphing flap receives loads as a structural member. That is, the shaft 121 may be provided to serve as a reinforcing member and resist loads. That is, the portion in which the morphing rib 11b is provided is a portion in which the rear spar is not available to be disposed, which may be a D-box configured with a box-shaped spar 15 and a skin 19, and may be provided that the shaft 121 is subjected to forces for additional structural reinforcement as loads are concentrated. For reference, the shaft 121 may be made of a material including aluminum, and may be in the form of a rod.

In addition, with reference to FIG. 3, the driving part 12 may include a driven gear 122 coupled to the other end of the shaft 121, a driving gear 123 transmitting a motion to the driven gear 122, and a motor 124 rotating the driving gear 123. With the driven gear 122, the driving gear 123, and the motor 124, loads on the ribs 11b and 11c through which the shaft 121 passes may be reduced when the shaft 121 is a driven shaft compared to when the shaft 121 is a driving shaft directly connected to the motor 124.

For example, when shaft 121 is directly connected to the motor 124, large vibrations (loads) may be applied to the ribs 11b and 11c through which shaft 121 passes. In contrast, according to the present invention, since the shaft 121 becomes a driven shaft, the loads applied to the ribs 11b and 11c through which the shaft 121 passes is reduced to secure strong durability compared to the case in which the shaft 121 becomes a driving shaft directly connected to the motor 124.

In addition, compared to the case in which the rotational speed of the driving gear 123 is greater than the rotational speed of the driven gear 122, the driven gear 122 may have a larger diameter than the driving gear 123 such that a gear ratio is formed to rotate the shaft 121 with a greater force. Since the morphing of the morphing rib 11b may be achieved when wind is applied to the wing according to the present invention, it is preferably that the shaft 121 is rotated with a large force to facilitate the driving of the morphing rib 11b even under wind force. According to the present invention, the shaft 121 may be rotated with a greater force, even when the shaft 121 is rotated with the same external force by the motor 124, compared to the case in which the rotational speed (a number of rotations) of the driven gear 122 is greater than the rotational speed of the driving gear 123, so that the efficient operation of the morphing rib 11b may be achieved. Therefore, the driven gear 122 is preferably provided with the rotational speed of the driven gear 122 being less than the rotational speed of the driving gear 123. To this end, it is preferable that the driven gear 122 has a larger diameter than the drive gear 123, and further that the driven gear 122 has the largest diameter (maximum size) possible in consideration of the thickness of the main wing 1 (thickness of the rib 11) based on the upward and downward directions in a portion in which the driven gear 122 is provided.

In addition, the driven gear 122 and the driving gear 123 may be positioned between the morphing rib 11b and a first rib 11d positioned at the other side in the lengthwise direction of the morphing rib 11b. More specifically, the driven gear 122 and the driving gear 123 may be positioned between the auxiliary rib 11c and the first rib 11d which are described above. In addition, the driven gear 122 may be positioned closer to the front of the wing than the driving gear 123. This is because the shaft 121 to which the driven gear 122 is connected is disposed to pass through the leading edges of the ribs 11b and 11c through which the shaft 121 passes.

In addition, with reference to FIG. 3, the motor 124 may be positioned at the other side of the first rib 11d. Specifically, the motor 124 may be positioned between the first rib 11d and a second rib 11e positioned at the other side of the first rib 11d. With the disposition conditions of the driven gear 122, the driving gear 123, and the motor 124, the driven gear 122, the driving gear 123, and the motor 124 may be disposed with high space utilization while making the shaft 121 a driven shaft.

In addition, with reference to FIG. 3, the rotational shaft of the motor 124 may pass through the first rib 11d and be connected to the driving gear 123.

Figure 6:
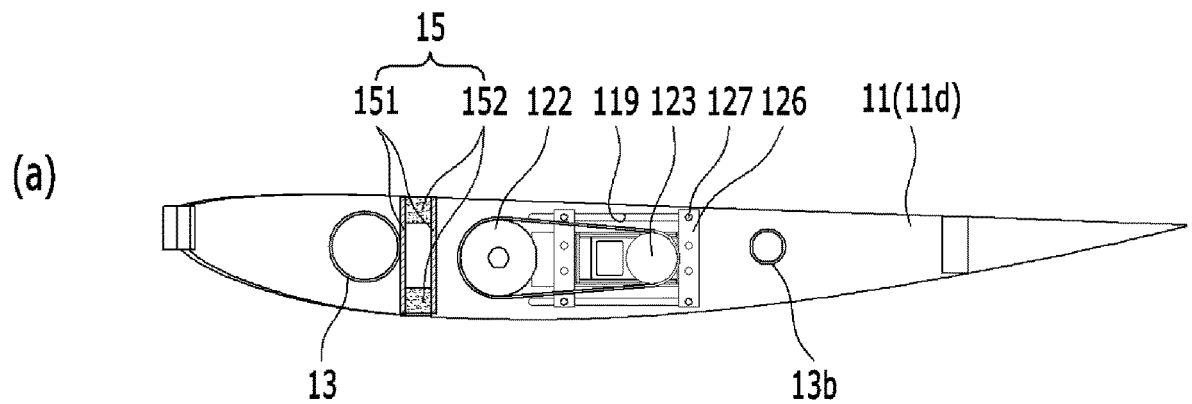
FIG. 6 is views illustrating a cross-section taken along line A-A and a cross-section taken along line the B-B in FIG. 5.
Figure 6:
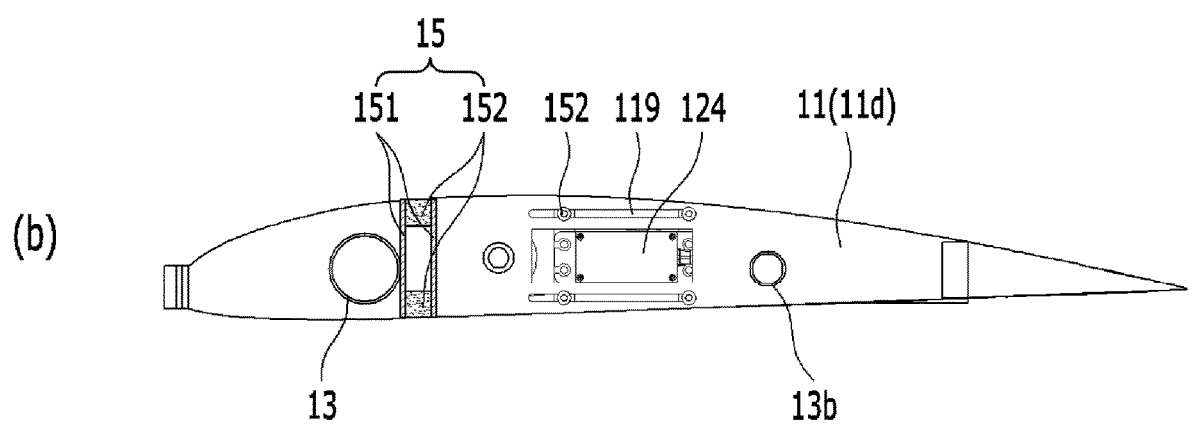

Also, with reference to FIGS. 3, 5, and 6, the driving part 12 may include a belt part 125 that transmits the motion of the driving gear 123 to the driven gear 122. The belt 125 may be a timing belt.

In addition, with reference to FIGS. 3 and 6, the driving part 12 may include a moving part configured to guide the movement of the motor 124 and the driving gear 123 in forward and backward directions so that the tension of the belt part 125 is adjustable, and a fixing part 127 configured to fix the relative position of the motor 124 and the driving gear 123 with respect to the moving part. For example, the moving part may include a slot 119 in the first rib 11d that extends in the forward and backward directions. Additionally, the moving part may include a motor 123 or a mount 126 coupled to the driving gear 123 and configured to move in forward and backward directions relative to the slot 119. The mount 126 may be in the form of a slide. Additionally, the fixing part 127 may fix the relative position of the mount 126 with respect to the slot 119, for example, the fixing part 127 may be a unit that is inserted into the slot 119 and is screw-coupled. When the fixing part 127 is unscrewed relative to the slot 119, the motor 124 and the driving gear 123 may move back and forth relative to the slot 119 (in this case, the fixing part 127 moves along the slot 119 in conjunction with the positional movement of the motor 124). When the motor 124 needs to be fixed in position, the motor 124 may be fixed in position by screw-tightening the fixing part 127. The moving part and the fixing part 127 may be implemented in the above-described form, and the moving part and the fixing part 127 may be provided in various other forms.

Accordingly, the tension of the belt 125 may be reduced (loosened) by moving the driving gear 123 and the motor 124 in a direction facing the driven gear 122. Alternatively, the tension of the belt 125 may be increased (tightened) by moving the driving gear 123 and the motor 124 in a direction opposite to the direction facing the driven gear 122.

According to the present invention, the tension of the belt 125 is adjustable, so that when disassembly of the driving part 12 is required, such as for replacement of the belt 125, the disassembly may be easily accomplished by loosening the belt 125. Furthermore, when there is a need to increase the tension of the belt 125 because the tension of the belt 125 has decreased, it is possible to increase the tension of the belt 125.

In addition, with reference to FIGS. 3 to 5, the driving part 12 may include an encoder 128 provided at the other end of the shaft 121. The encoder 128 may measure the rotational speed of the shaft 121 such that the information on driving the morphing rib 11b is calculated from the rotational speed of the shaft 121. For example, the wing according to the present invention may include a control part that controls the wing, and the control part may control the driving part 12 to control the morphing of the morphing rib 11b. In this case, the control part may need to identify a morphing state (morphed state or driven state) of the morphing rib 11b in order to control the morphing rib 11b, and since the morphing rib 11b is morphing by the rotation of the shaft 121, the morphing state of the morphing rib 11b may be identified by the rotational speed of the shaft 121. In consideration of the identified rotational speed of the shaft, the encoder 128 may measure the rotational speed of the shaft 121 and transmit the measured rotational speed to the control part.

For reference, the control part may also control a driving part that extends or reduces the scissors part 22 of the span morphing part 2 in the lengthwise direction. Accordingly, the control part may control the length extension or length reduction of the wing according to the present invention.

In addition, with reference to FIG. 1, the main wing 1 may include a wing pipe 13 connecting the main wing 1 and the fuselage.

In addition, with reference to FIG. 1, the main wing 1 may include a hollow reinforcing sleeve 14 configured to enclose at least a portion of the wing pipe 13 and to be disposed to transverse the leading edge of at least some of the plurality of ribs positioned at the other side of the some of the rib 11a in front of the driving part 12. The reinforcing sleeve 14 may be made of a material including carbon. Accordingly, the reinforcing sleeve 14 may be a circular carbon pipe. Therefore, structural stability may be achieved by maximizing a contact area while increasing space efficiency by the reinforcing sleeve 14. In addition, the reinforcing sleeve 14 may be provided to contact the shear web of the spar to support loads received by the spar. For example, the reinforcing sleeve 14 may be provided in contact with the plate 151 of the box-shaped spar 15 to support the loads received by the box-shaped spar 15.

Additionally, with reference to FIGS. 5 and 6, the main wing 1 may include an additional wing pipe 13b. That is, the wing according to the present invention 1 may be provided with two wing pipes 13 and 13b that are coupled to the fuselage on one side portion of the wing, which is the root part of the wing.

In addition, with reference to FIGS. 1, 4, and 6, the main wing 1 may include a box-shaped spar 15. The box-shaped spar 15 may be provided between the reinforcing sleeve 14 and the driving part 12 to transverse the leading edge of at least some of the plurality of ribs positioned at the other side of some of the ribs 11a, such that a closed structure is formed at the leading edge of the morphing rib 11b.

For example, with reference to FIGS. 4 and 6, the box-shaped spar 15 may include a pair of plates 151 disposed to be spaced apart from each other in the forward and backward direction, and a pair of blocks 152 interposed between the pair of plates 151 and disposed to be spaced apart from each other in the upward and downward direction. Accordingly, the box-shaped spar 15 may be provided to be coupled to the ribs 11 such that the pair of blocks 152 traverse the ribs 11 with respect to the ribs 11 that the box-shaped spar 15 is to traverse (for example, an upper block 152 traverses an upper portion of the ribs 11 and a lower block 152 traverses a lower portion of the ribs 11). That is, the box-shaped spar 15 may be provided in the form that the pair of plates 151 and the pair of blocks 152 extend between the rib 11 and neighboring rib 11, and that the pair of blocks 152 traverse the rib 11 in a section to transverse the rib 11.

For reference, the box-shaped spar 15 and the reinforcing sleeve 14 may constitute a main spar, which may be designed to maintain structural rigidity even there is no trailing edge of the morphing flap.

Materials of the plates 151, blocks 152 of the box-shaped spar 15 may be selectively applied, such as metal, wood, plastic, and the like, in consideration of the scale of the wing, the external force applied, the usage environment, and the like.

Figure 7:
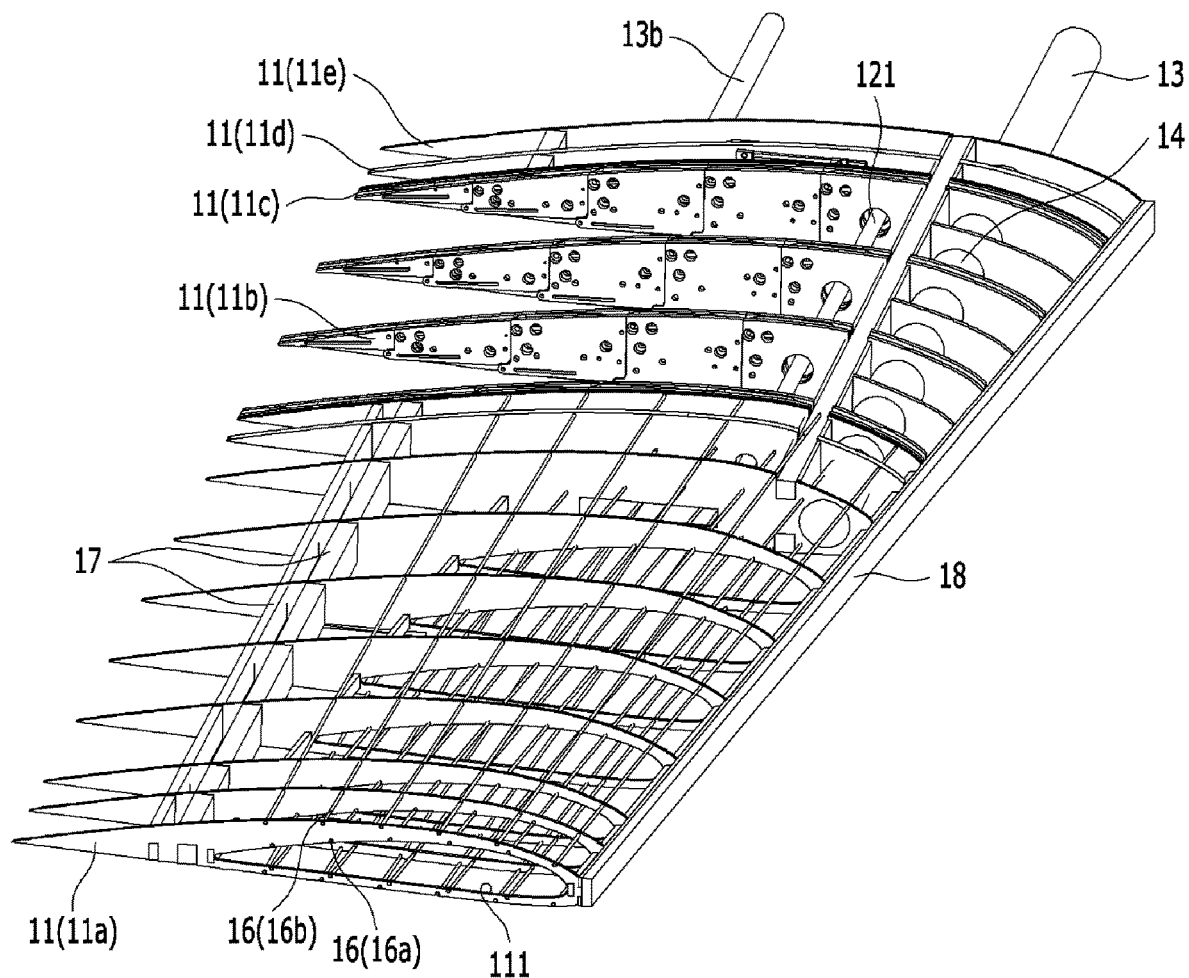
FIG. 7 is a schematic conceptual perspective view illustrating the main wing of the wing according to an embodiment of the present invention, from a different angle than FIGS. 3 and 4, with some configurations omitted.
Figure 8:
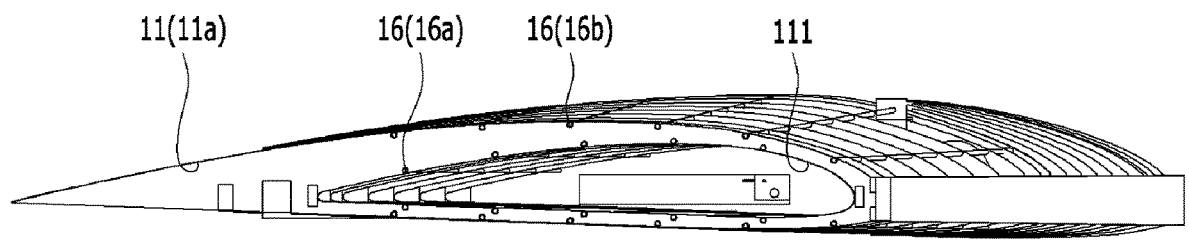
FIG. 8 is a schematic conceptual side view illustrating the main wing of the wing according to an embodiment of the present invention, viewed from the other side of the wing in the lengthwise direction, with some configurations omitted.

FIG. 7 is a schematic conceptual perspective view illustrating the main wing of the wing according to an embodiment of the present invention, from a different angle than FIGS. 3 and 4, with some configurations omitted, FIG. 8 is a schematic conceptual side view illustrating the main wing of the wing according to an embodiment of the present invention, viewed from the other side of the wing in the lengthwise direction, with some configurations omitted.

With reference to FIGS. 7 and 8, the main wing 1 may include a plurality of stringers 16 provided to traverse some of the ribs 11a to share loads acting on the main wing 1. Specifically, the plurality of stringers 16 may be provided to connect the rib 11 positioned at one side of some other rib 11b. In this case, the ribs 11 to which the stringers 16 connect may include some of the ribs 11a in which the aforementioned through-hole 111 is formed, and some of the ribs 11b positioned between some of the ribs 11a and some other of ribs (the morphing rib 11b).

Additionally, the rib 11 to which the stringers 16 are coupled may be formed such that the holes through which the stringers 16 pass are configured to allow the stringers 16 to be disposed in a straight line. Therefore, the stringer 16 may remain in a straight line.

The main wing 1 is to accommodate the auxiliary wing 21. Consequently, a portion of the main wing 1 in which the auxiliary wing 21 is accommodated is difficult to be provided with a spar. In consideration of this, a stringer 16 may be provided. Therefore, structural stability may be achieved. That is, the stringer 16 may be considered a structure that supports the main wing 1 to provide a space inside the wing while maintaining structural rigidity. For reference, the stringer 16 may be a rod made of a material including carbon.

With reference to FIGS. 7 and 8, some 16a of the plurality of stringers 16 may be provided at intervals along the periphery of the pass-through hole 111, which is formed in some of the ribs 11a and through which the auxiliary wing 21 and the scissors part 22 pass, and some other 16b of the plurality of stringers 16 may be provided at intervals along the periphery of the pass-through hole 111 at the outer side of some 16a of the stringers 16. Some 16b of the other stringers 16 may be disposed in a position and at an angle that maintains a straight line on the surface.

In addition, with reference to FIGS. 1, 3, 4, and 7, the main wing 1 may include a rear spar 17. The rear spar 17 may be provided to transverse the trailing edge of the rib positioned at the other side of the morphing rib 11b. That is, the rear spar may be provided except where the morphing flap is applied.

Further, with reference to FIGS. 1, 3, 4, and 7, the main wing 1 may include a leading edge 18. The leading edge 18 is obvious to those of ordinary skill in the art and will not be described in detail.

Hereinafter, a cross-section of each portion of the main wing 1 will be described with reference to FIG. 9.

Figure 9:
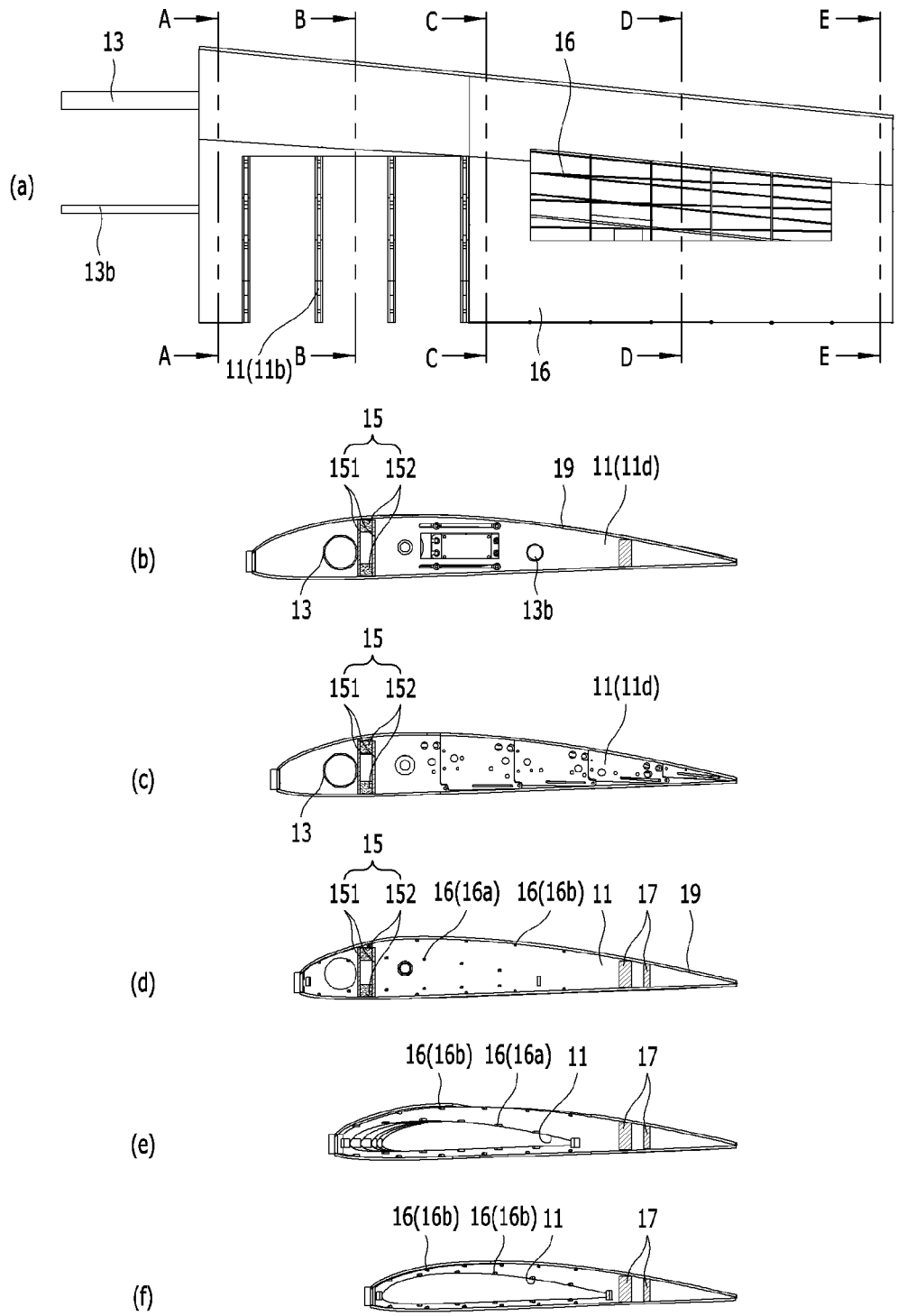
FIG. 9 is a schematic conceptual view illustrating a cross-section of each portion of the main wing of the wing according to an embodiment of the present invention.

FIG. 9 is a schematic conceptual view explaining a cross-section of each portion of the main wing of the wing according to an embodiment of the present invention. Specifically, FIG. 9B is an cross-sectional view taken along line the A-A of FIG. 9, FIG. 9C is a cross-sectional view taken along line the B-B of FIG. 9, FIG. 9D is a C-C cross-sectional view of FIG. 9, FIG. 9E is a D-D cross-sectional view of FIG. 9, and FIG. 9F is an E-E cross-sectional view of FIG. 9.

Referring to FIGS. 9A and 9B, the main wing 1 may comprise two wing pipes 13, 13b having one side portion that is a root portion (e.g., the cross-sectional portion taken along line A-A) coupled to the fuselage. The two wing pipes 13 and 13b may be carbon pipes. In this case, with reference to FIG. 9C, the reinforcing sleeve 14 connected to the wing pipe 13, which is positioned forward among the two wing pipes 13 and 13b, may be in contact with the main spar (specifically, the box-shaped spar 15) to receive loads. Additionally, the main wing 1 is a portion subjected to the greatest shear force and moment, and a skin 19 may be attached throughout the main wing 1 such that the overall section of the main wing 19 is a closed section. Further, referring to FIG. 9C, a portion that is a flap end where the rear spar may not be disposed may be provided with a shaft 121 in the form of an aluminum rod for additional structural reinforcement, as the loads are concentrated in the D-box consisting of the skin 19 and the main spar (specifically the box-shaped spar 15). Also, referring to FIG. 9D, the ribs 11, which are positioned between some of the ribs 11a and some other of the morphing ribs 11b, may be a connection portion that transfers loads from the stringers 16 at the wingtips to the main spar, and may have a closed cross-section. Furthermore, with reference to FIG. 9E, a portion in which some of the ribs 11a are provided may be a portion in which the auxiliary wing 21 for a variable span is housed. Furthermore, with reference to FIGS. 9A and 9B, the stringers 16 may be provided to receive loads from the wing deployment as well as loads from the wing tips, in which the stringers 16 may be carbon rods and may be provided with 22 pieces, specifically, some 16a of the stringers may be provided with 10 pieces and some other 16b of the stringers may be provided with 12 pieces. Further, with reference to FIGS. 1 and 9D and 9E, the rear spar 17 may be provided to traverse the ribs 11 positioned at the other side of the morphing rib 11b, in which a portion of the trailing edge may be cut and used as an aileron, and the rear spar 17 may be disposed in double rows with reference to FIGS. 1, 7 and 9C and 9E. Further, with reference to FIG. 9E, the other side portion of the main wing 1 may be closed in cross-section by the skin 19, as stresses may be concentrated when the auxiliary wing 21 is fully deployed.

In addition, with reference to FIG. 1, the main wing 1 may include a skin 19. The skin 19 is a portion subjected to the greatest shear force and moment, and may be provided throughout the main wing 1 such that the overall cross-section of the main wing 1 is a closed section. The skin 19 may be made of an elastic material. The skin 19 is obvious to those of ordinary skill in the art and will not be described in detail.

According to the above description, the wing according to the present invention relates to a wing to which two or more morphings are applied, in which a "variable camber, variable chord" morphing and a "variable span" morphing may be applied. The "variable camber, variable chord" morphing may be implemented by a morphing flap including the morphing rib 11b and the driving part 12, which is described above, and the "variable span" morphing may be implemented by the span morphing part 2 described above. According to the "variable span" morphing, the wingspan of an aircraft changes during flight, thereby changing the flight characteristics of the aircraft, allowing the aircraft to perform different missions.

Furthermore, the wing according to the present invention may apply the above two morphings, and unlike conventional wings, the wing is designed to eliminate the rear spar and support the loads with only the front spar, thereby maximizing space utilization, and the other end of the main wing 1 may be hollowed out by using the stringers 16 instead of the spars (i.e., using longeron instead of the rib spar structure) to accommodate the auxiliary wing 21.

In addition, the present invention provides an aerial vehicle according to an embodiment of the present invention including the wing that is described above. The aerial vehicle according to an embodiment of the present invention includes the wing according to the present invention and a fuselage to which the wing is coupled.

It will be appreciated that the embodiments of the present application have been described above for purposes of illustration, and those skilled in the art may understand that the present application may be easily modified in other specific forms without changing the technical spirit or the essential features of the present application. Therefore, it should be understood that the above-described embodiments are illustrative in all aspects and do not limit the present invention. For example, each component described as a single type may be carried out in a distributed manner. Likewise, components described as a distributed type can be carried out in a combined type.

The scope of the present application is represented by the claims to be described below rather than the detailed description, and it should be interpreted that the meaning and scope of the claims and all the changes or modified forms derived from the equivalent concepts thereto fall within the scope of the present application.

The invention claimed is:

1. A transformable wing configured to be connected to a fuselage in a lengthwise direction, the transformable wing comprising:
   a main wing comprising:
      a plurality of ribs extending in forward and backward directions of the transformable wing, wherein the plurality of ribs are disposed at intervals in the lengthwise direction of the transformable wing; and
   a span morphing part comprising:
      an auxiliary wing extending in the lengthwise direction;

a scissors part connected to one end of the auxiliary wing in the lengthwise direction; and
a driving part configured to extend or reduce the scissors part in the lengthwise direction,
wherein the auxiliary wing and the scissors part of the span morphing part are configured to movably pass through some of the plurality of ribs positioned at one side of the main wing in the lengthwise direction,
wherein some other of the plurality of ribs are positioned at another side of the main wing in the lengthwise direction, each of the some other of the plurality of ribs having a morphing rib,
wherein the morphing rib is configured to transform at least one of a chord length or a camber of a portion of an airfoil where the some other of the plurality of ribs are disposed,
wherein the main wing further comprises a driving part configured to operate the morphing ribs,
wherein the driving part of the main wing comprises:
a driven gear;
a driving gear configured to transmit motion to the driven gear; and
a motor configured to rotate the driving gear,
wherein the driven gear and the driving gear are positioned between the morphing rib and a first rib positioned at one side of the morphing rib in the lengthwise direction of the main wing,
wherein the driven gear is positioned closer than the driving gear toward a front of the main wing, and
wherein the motor is positioned at one side of the first rib in the lengthwise direction of the main wing, and
wherein a rotational shaft of the motor passes through the first rib to be connected to the driving gear.

2. The transformable wing of claim 1,
wherein the auxiliary wing comprises a plurality of auxiliary wing ribs, each extending in the forward and backward directions of the auxiliary wing, the plurality of auxiliary wing ribs being disposed at intervals in the lengthwise direction,
wherein some of the plurality of auxiliary wing ribs are positioned at one side of the auxiliary wing in the lengthwise direction, each of the some of the plurality of auxiliary wing ribs having a closed rib having a closed cross-section cut in the forward and backward directions,
wherein some other of the plurality of auxiliary wing ribs are positioned at another side of the auxiliary wing in the lengthwise direction, each of the some other of the plurality of auxiliary wing ribs having an open rib having a pass-through hole having a size capable of passing therethrough the scissors part in the lengthwise direction, and
wherein at least one portion of the scissors part is disposed inside a space defined by the pass-through holes while the auxiliary wing is disposed in the main wing.

3. The transformable wing of claim 2,
wherein the closed rib is configured to provide rigidity of the auxiliary wing, when the auxiliary wing is exposed to an outside of the main wing when the auxiliary wing is extended, and
wherein the open rib has the space to accommodate the scissors part therein.

4. The transformable wing of claim 1,
wherein the driving part further comprises:
a shaft configured to pass through a leading edge of the morphing rib and rotatably disposed relative to the morphing rib to operate the morphing rib,
wherein the driven gear is coupled to one end of the shaft, and
wherein the shaft is configured to be driven by the driven gear, thereby reducing loads on the plurality of ribs, compared to when the shaft is directly connected to the motor.

5. The transformable wing of claim 4,
wherein the driven gear has a diameter larger than a diameter of the driving gear to have a gear ratio that rotates the shaft with a greater force, compared to a case in which a rotational speed of the driving gear is greater than a rotational speed of the driven gear.

6. The transformable wing of claim 4,
wherein the driving part comprises:
a belt part configured to transmit a motion of the driving gear to the driven gear;
a moving part configured to guide a movement of the motor and the driving gear in forward and backward directions so that tension of the belt part is adjustable; and
a fixing part configured to fix a position of the motor and the driving gear with respect to the moving part.

7. The transformable wing of claim 4, further comprising:
an encoder disposed at the one end of the shaft,
wherein the encoder is configured to measure a rotational speed of the shaft such that information on driving the morphing rib is calculated from the rotational speed of the shaft.

8. The transformable wing of claim 1,
wherein the main wing further comprises:
a wing pipe configured to connect the main wing and the fuselage; and
a hollow reinforcing sleeve configured to enclose at least a portion of the wing pipe, the hollow reinforcing sleeve traversing a leading edge of at least some of the plurality of ribs positioned at the another side of the main wing in front of the driving part.

9. The transformable wing of claim 8,
wherein the main wing further comprises a box-shaped spar disposed between the hollow reinforcing sleeve and the driving part, the box-shaped spar traversing the leading edge of the at least some of the plurality of ribs positioned at the another side of the main wing to form a closed structure at the leading edge of the morphing rib.

10. The transformable wing of claim 9,
wherein the box-shaped spar comprises:
a pair of plates disposed to be spaced apart from each other in the forward and backward directions; and
a pair of blocks disposed between the pair of plates and spaced apart from each other in upward and downward directions.

11. The transformable wing of claim 1,
wherein the main wing further comprises a plurality of stringers transversing the some of the plurality of ribs to share loads acting on the main wing, and
wherein some of the plurality of stringers are disposed at intervals along a periphery of pass-through holes, each of the pass-through holes being defined in each of the some of the plurality of ribs,
wherein the pass-through holes are configured to pass therethrough the auxiliary wing and the scissors part, and
wherein some other of the plurality of stringers are disposed at intervals along the periphery of the pass-through holes at an outer side of the some of the plurality of stringers.

12. An aerial vehicle comprising:
the transformable wing according to claim 1; and
a fuselage to which the transformable wing is coupled.

* * * * *